United States Patent
Mysker

(10) Patent No.: US 7,063,610 B2
(45) Date of Patent: *Jun. 20, 2006

(54) APPARATUS AND METHOD TO NET FOOD PRODUCTS IN SHIRRED TUBULAR CASING

(75) Inventor: Thomas Mysker, Twin Lakes, WI (US)

(73) Assignee: Poly-Clip System Corp., Mundelein, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/867,977

(22) Filed: Jun. 15, 2004

(65) Prior Publication Data

US 2005/0087075 A1    Apr. 28, 2005

Related U.S. Application Data

(63) Continuation-in-part of application No. 10/695,115, filed on Oct. 28, 2003.

(51) Int. Cl.
*A22C 11/00* (2006.01)
(52) U.S. Cl. ...................................... 452/30
(58) Field of Classification Search ............ 452/32–35, 452/46, 51, 37, 48
See application file for complete search history.

(56) References Cited

U.S. PATENT DOCUMENTS

| | | |
|---|---|---|
| 2,922,186 A | 1/1960 | Sartore |
| 3,014,024 A | 12/1961 | Lieberman et al. |
| 3,805,480 A | 4/1974 | Cherio et al. |
| 4,133,164 A | 1/1979 | Mintz |
| 4,466,465 A | 8/1984 | Frey |
| 4,525,895 A | 7/1985 | Raudys |
| 4,621,482 A | 11/1986 | Crevasse et al. |
| 4,716,713 A | 1/1988 | Crevasse et al. |
| 4,719,116 A | 1/1988 | Crevasse |
| 4,771,510 A | 9/1988 | Kawai |
| 4,910,034 A | 3/1990 | Winkler |
| 4,924,552 A | 5/1990 | Sullivan |
| 4,958,477 A | 9/1990 | Winkler |
| 5,024,041 A * | 6/1991 | Urban et al. .................. 53/449 |
| 5,135,770 A * | 8/1992 | Underwood ................ 426/650 |
| 5,156,567 A | 10/1992 | Gammon et al. |
| 5,215,495 A | 6/1993 | Crevasse |
| 5,273,481 A | 12/1993 | Sullivan |
| 5,698,279 A | 12/1997 | Vicik |
| 6,117,003 A * | 9/2000 | Brinson ....................... 452/31 |
| 6,416,832 B1 | 7/2002 | Uehara et al. |

* cited by examiner

*Primary Examiner*—Thomas Price
(74) *Attorney, Agent, or Firm*—Trexler, Bushnell, Giangiorgi, Blackstone & Marr, Ltd.

(57) ABSTRACT

An apparatus and method to net shirred tubular casing, in order to create a highly-dimpled foot product. A filling horn, shir housing, and removable netting tube allow for the extrusion of food products into an edible tubular collagen film, which itself expands into a netting of a smaller diameter than that of the film. As the food product under pressure expands against the tubular film, it presses through the spaces in the netting to created a dimpled appearance. After the food product has been further processed, the netting is removed, leaving a highly-dimpled appearance.

7 Claims, 12 Drawing Sheets

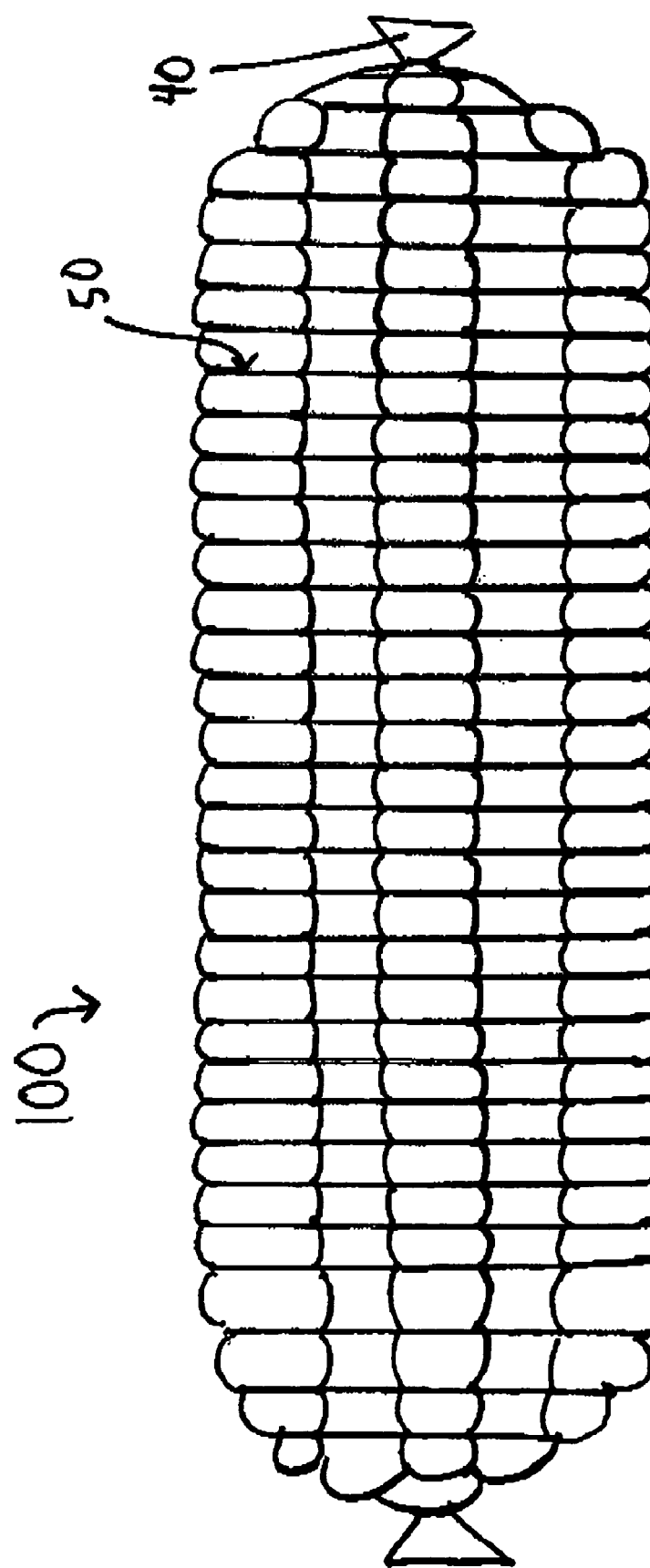

APPARATUS AND METHOD TO NET FOOD PRODUCTS IN SHIRRED TUBULAR CASING

CROSS-REFERENCE TO RELATED APPLICATION

This application is a continuation-in-part of U.S. patent application Ser. No. 10/695,115, Apparatus and Method to Net Food Products in Shirred Tubular Casing, filed on Oct. 28, 2003.

BACKGROUND OF THE INVENTION

This invention relates to the field of preparing food products in shirred, tubular casings and enclosing the products in netting. As used in this specification, the term "shir" refers to the process of gather a continuous tube of casing material over a tube or horn. The term "ruck" means to shir netting over a tube or horn. Traditionally, meat products were wrapped in netting prior to processing. Removal of the netting after processing, whether it be cooking, smoking, curing, aging, or otherwise, often resulted in some of the meat products sticking to the netting and being pulled off during the removal process, leaving an unsightly appearance unpleasant to consumers.

The use of edible collagen films solved this problem. Meat products, including sausages and whole-muscle products, are now conventionally enveloped into a tubular shape in an edible collagen film. In the prior art, flat sheets of collagen film are turned over plows to form a sausage casing. The casing is then wrapped in a net and the product is further processed, such as cooking, aging, or smoking. After processing, the netting is removed easily, as it does not stick to the collagen film. Various collagen films can be used, including flavored and colored films, to create various taste sensations or appearances.

The use of flat sheets of collagen films requires the use of complicated plows and guides, as noted in U.S. Pat. No. 4,958,477 to Winkler. The use of such an arrangement requires extended set up time and diligent supervision during operation. This method also produces quite a bit of overlap of film and allows food product to leak at the seams if insufficient overlap is not present. Accordingly, this method inefficiently wastes film.

The use of netting provides a mesh or dimpled appearance on the surface of the food products. Having a dimpled appearance is considered more appealing to consumers, so there is an advantage to being able to create a highly-dimpled appearance in a food product, especially sausages and hams and other smoked products.

Accordingly, a need exists for a simpler, more efficient, easier way to encase food products in collagen film, requiring less set up time, less supervision, and producing a highly-dimpled end product. The present invention fills this need.

BRIEF SUMMARY OF THE INVENTION

The present invention uses tubular shirred casing, rather than sheets of casing film, and the extrusion of the food products into a casing of larger diameter than the netting, which will cause the netting to constrict around the casing, leaving a dimpled appearance. Food products, either sausages or whole-muscle meats, are extruded through a tube or horn through a shir housing on which a tubular edible collagen film has been shirred. In a first embodiment, the shir housing is coaxial to a netting tube on which netting, of smaller diameter than that of the collagen film, has been rucked. As the food products exit the shir housing and extrude into the tubular film, they expand the film, pushing that film outwards and against the netting. Since the collagen film is of a larger diameter than the netting, the pressure of the food products against the collagen film creates a dimpled appearance in that film. In another embodiment, the netting is carried on a removable tube.

It is an object of this invention to create an apparatus and method of packing food products in a tubular edible collagen film, rather than wrapping the food products in cylindrical form in flat sheets of collagen film. It is a further object of this invention to package the food products in a tubular collagen film of a larger diameter than the netting, in order to emphasize the dimpled appearance of the products. Although the invention will be described for the use of sausage, it can be used for any product, including whole-muscle meats, cheeses, vegetarian sausage, or any other product in which a dimpled appearance is desired.

BRIEF DESCRIPTION OF THE DRAWINGS

FIG. 12 is a side view of a sausage made by the apparatus of the present invention.

DETAILED DESCRIPTION OF THE PREFERRED EMBODIMENTS OF THE INVENTION

Figure 1:
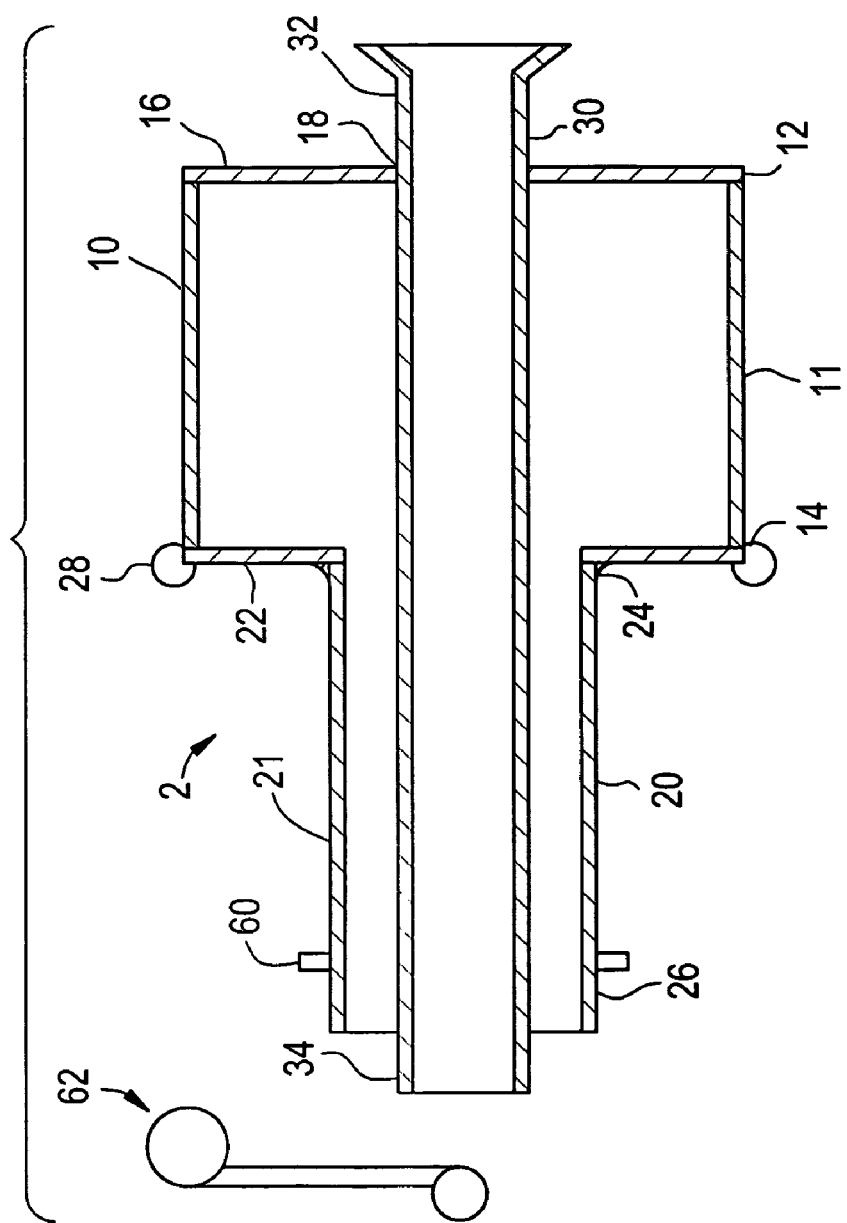
FIG. 1 is a cross-sectional view of the apparatus of one embodiment of the present invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The apparatus 2 comprises a shir housing 10, a netting tube 20, and a filling horn 30, as shown in FIG. 1. The filling horn 30 is a long tube that attaches to and protrudes horizontally from a standard food preparation apparatus, not pictured, such as a conventional sausage-making machine.

Figure 2:
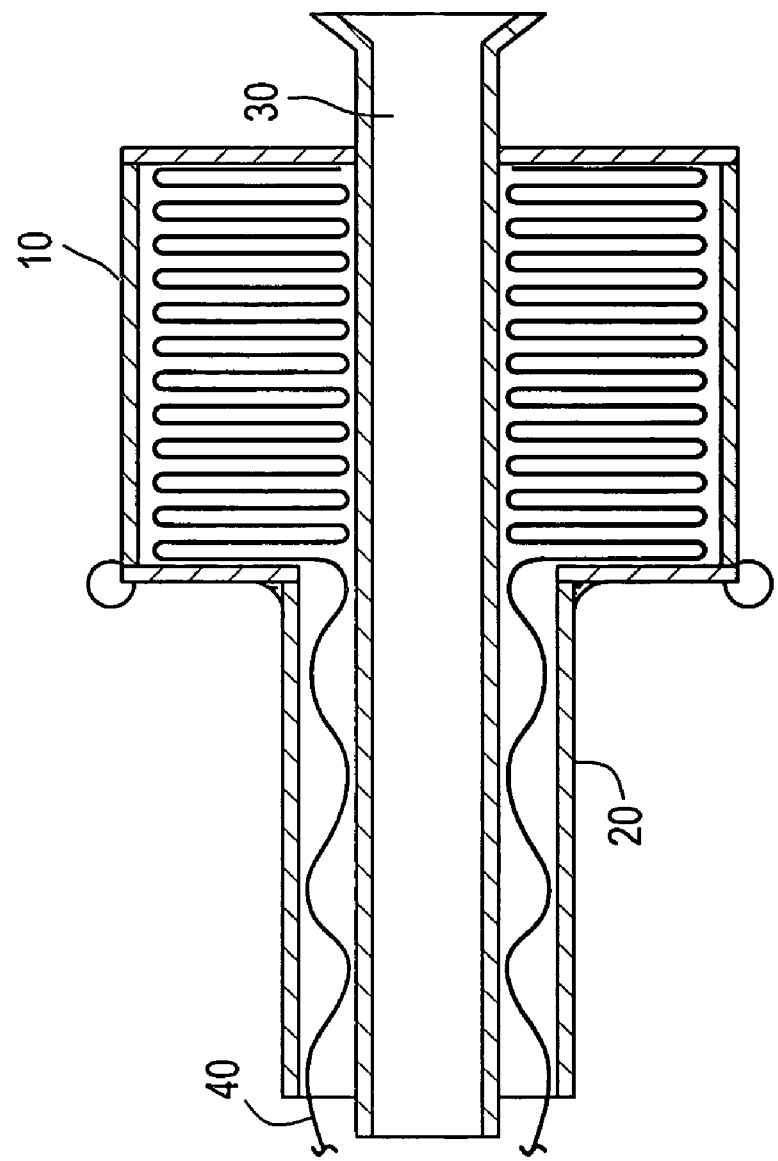
FIG. 2 is a cross-sectional view of an embodiment of the apparatus of the present invention, showing the film shirred thereon.

Tubular edible collagen film 40 is shirred onto the filling horn 30 prior to use, as shown in FIG. 2, which illustrates the filling horn 30 with the film 40 shirred onto the filling horn 30. As shown in FIG. 2, the film 40 is of a greater diameter than the outside diameter of the filling horn 30. Accordingly, when the film 40 is shirred onto filling horn 30, film 40 is bunched up at the upstream end 32 of filling horn 30.

Figure 11:
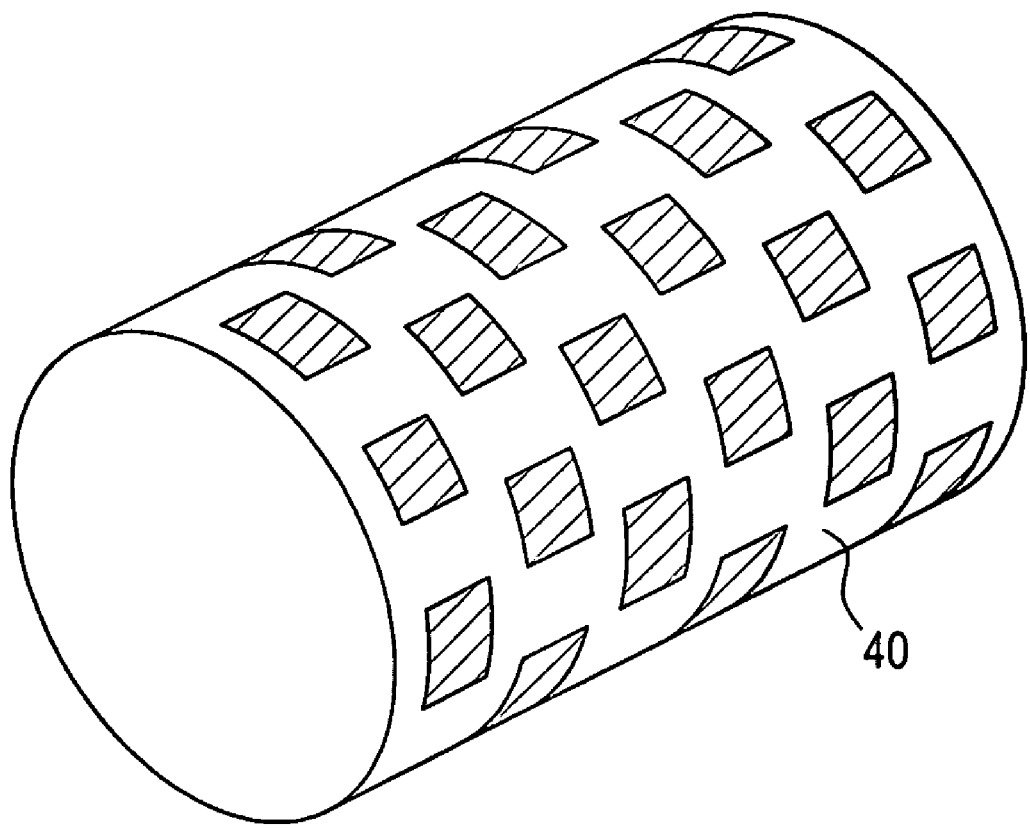
FIG. 11 is a side view of a tubular edible collagen film which can be used in present invention.

The tubular edible collagen film 40 can be dyed, and can be dyed in a pattern, see FIG. 11. The tubular edible collagen film 40 can have flavoring, which can be smoke flavoring.

The shir housing 10 is also a tube 11 of larger diameter than that of the filling horn 30, so that the bunched-up film 40 will fit between filling horn 30 and shir housing 10. In the preferred embodiment, the shir housing 10 has a seven-inch diameter while the filling horn 30 has a three-inch diameter. The shir housing 10 is welded at its upstream end 12 to a back plate 16. The back plate 16 attaches to the sausage-making machine and contains an aperture 18 through which the filling horn 30 extends. Accordingly, the filling horn 30 is coaxial to and inside of the shir housing 10. The filling horn 30 can either sit snugly within the aperture 18, or can be sealed with a suitable gasket, or can be welded directly to the back plate 16.

Figure 3:
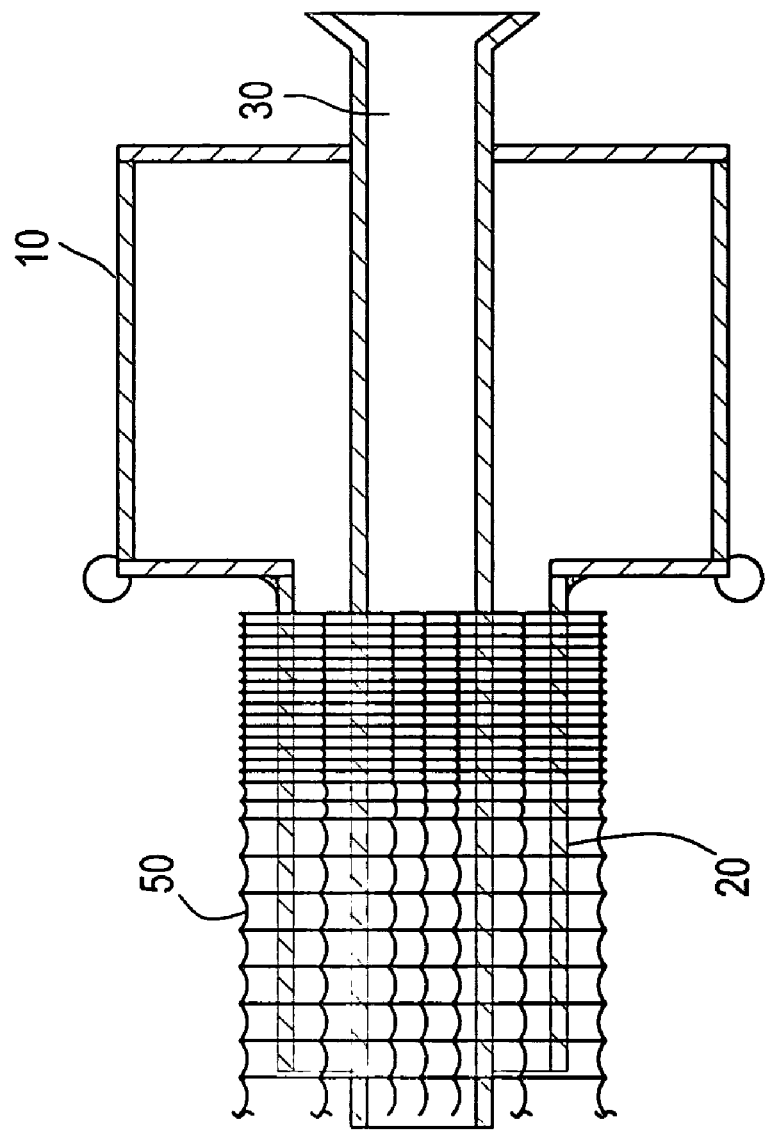
FIG. 3 is a cross-sectional view of an embodiment of the apparatus of the present invention, showing the netting rucked thereon.

The netting tube 20 in a first embodiment is an elongated tubular member 21 welded to a transition plate 22 at its upstream end 24. The netting tube 20 attaches to the shir housing 10 at the downstream end 14 of the shir housing 10. Preferably, fasteners 28 sold under the brand name QUICK LOCK® are used, but any convenient means of attachment will suffice, such as bayonet pins, locking pins, threaded fasteners, interference fit, or anything else that attaches the transition plate 22 of the netting tube 20 to the shir housing 10. In this embodiment, netting 50 is rucked onto netting tube 20 as shown in FIG. 3. The netting 50 is of a smaller diameter than that of the tubular film 40. Accordingly, the netting tube 20 is of an intermediate diameter to that of the shir housing 10 and the filling horn 30. In the preferred embodiment, the netting tube 20 has a diameter of four inches.

In this embodiment, a break ring 60 can be placed on the downstream end 26 of the netting tube 20, to rectify the release of netting 50 from the netting tube. Preferably, however, a derucking rectifier is used in order to obtain sausages of consistent length.

A user of apparatus 2 will preferably have at least two netting tubes 20. While one netting tube 20 is attached to apparatus 2 and being used to make, for example, sausage, as will be described below, a spare netting tube 20 will be in the process of having netting 50 rucked onto it. Netting often comes from a manufacturer wound circumferentially on a tube, and must be rucked onto a netting tube 20, preferably by an apparatus such as is described in copending U.S. patent application Ser. No. 10/675,440, Improved Net Rucking Apparatus and Method, filed on Sep. 30, 2003.

Figure 4:
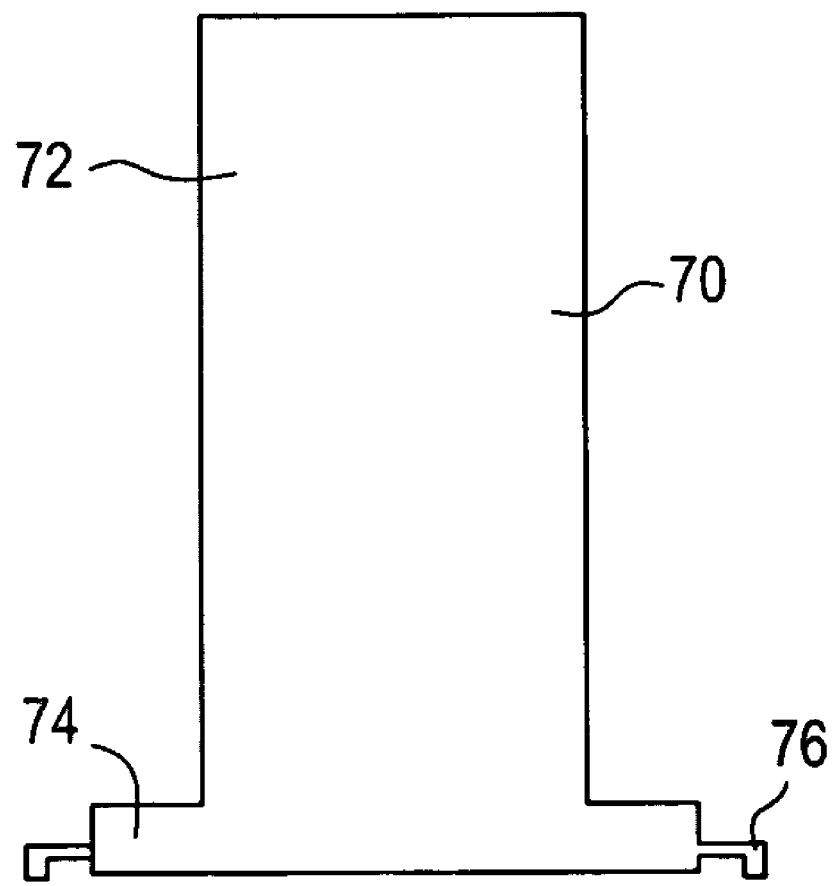
FIG. 4 is an elevation view of a removable tube as used in one embodiment of the present invention.
Figure 5:
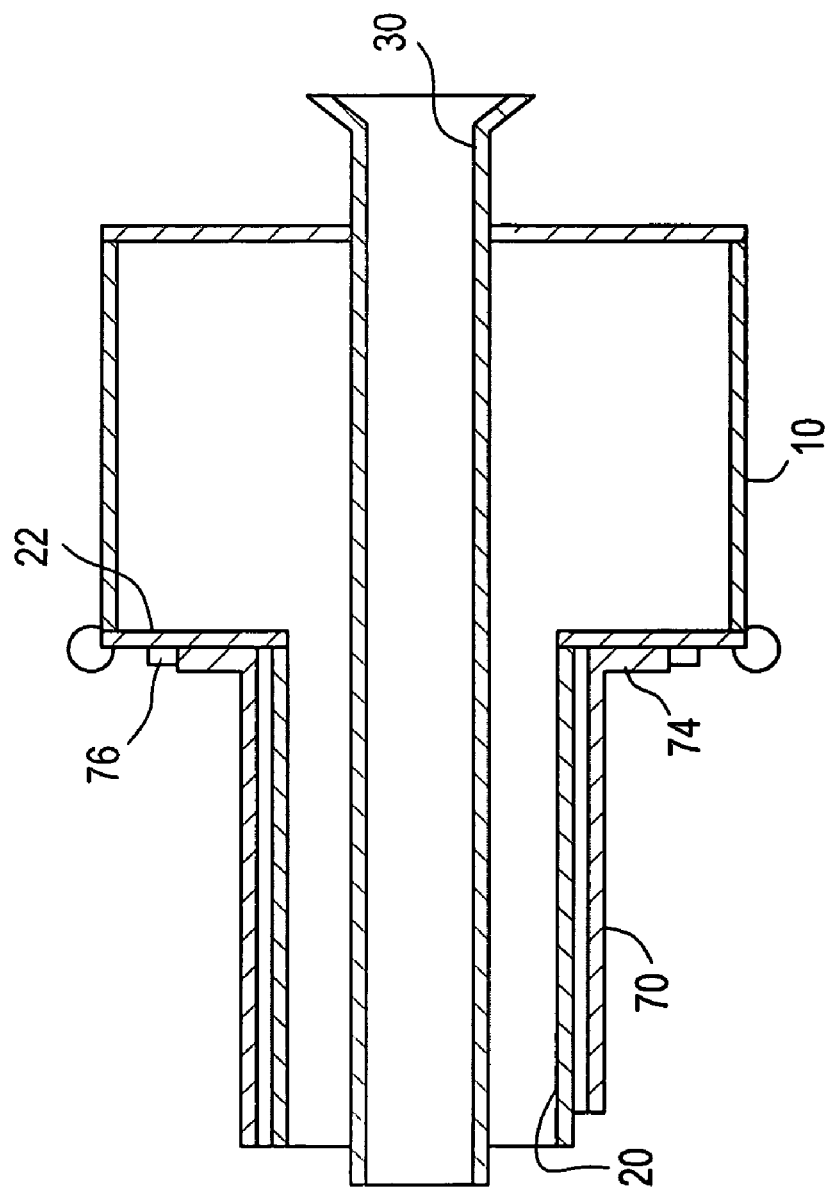
FIG. 5 is a cross-sectional view of the apparatus of the present invention, with the removable tube of FIG. 4 in use.

In another embodiment, netting 50 is purchased already rucked onto a removable tube 70. Removable tube 70, as illustrated in FIG. 4 without netting 50, is preferably plastic and can be a disposable or recyclable plastic. Removable tube 70 is an elongated tubular section 72 and a base plate 74. In this embodiment, base plate 74 locks onto transition plate 22, as shown in FIG. 5. Base plate 72 preferably is configured to lock onto transition plate 22 with a bayonet-lock arrangement 76 but any type of attachment, such as fasteners 28 sold under the brand name QUICK LOCK®, locking pins, threaded fasteners, interference fit, or other means will suffice. In this embodiment, the user of apparatus 2 does not need to have multiple netting tubes 20 or a separate net nicking apparatus, since the netting 50 is rucked onto removable tube 70 by an outside vendor.

Please note that a break ring 60 can be used to rectify the rate at which netting 50 comes off removable tube 70.

If removable tube 70 is used, several alternative arrangements are possible for netting tube 20. In one embodiment, netting tube 20 is as described above in connection with FIG. 5. Removable tube 70 slides over netting tube 20 and locks onto transition plate 22. The user of apparatus 2 then has the option of using netting 50 that has already been rucked onto removable tubes 70, or using a separate rucking apparatus as described above to ruck netting 50 onto netting tube 20.

Figure 6:
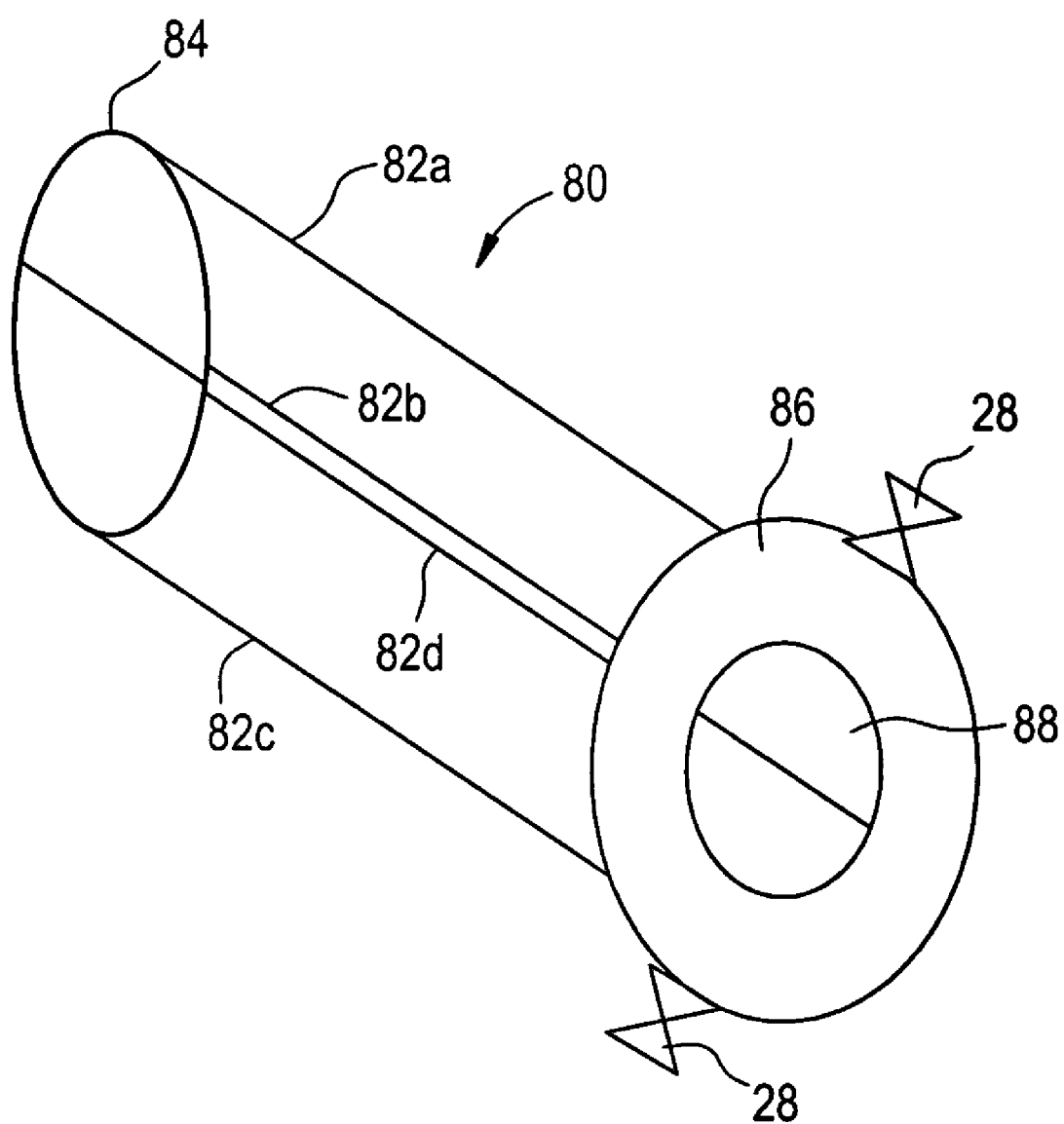
FIG. 6 is a perspective view of a tube holder as used in one embodiment of the present invention.
Figure 7:
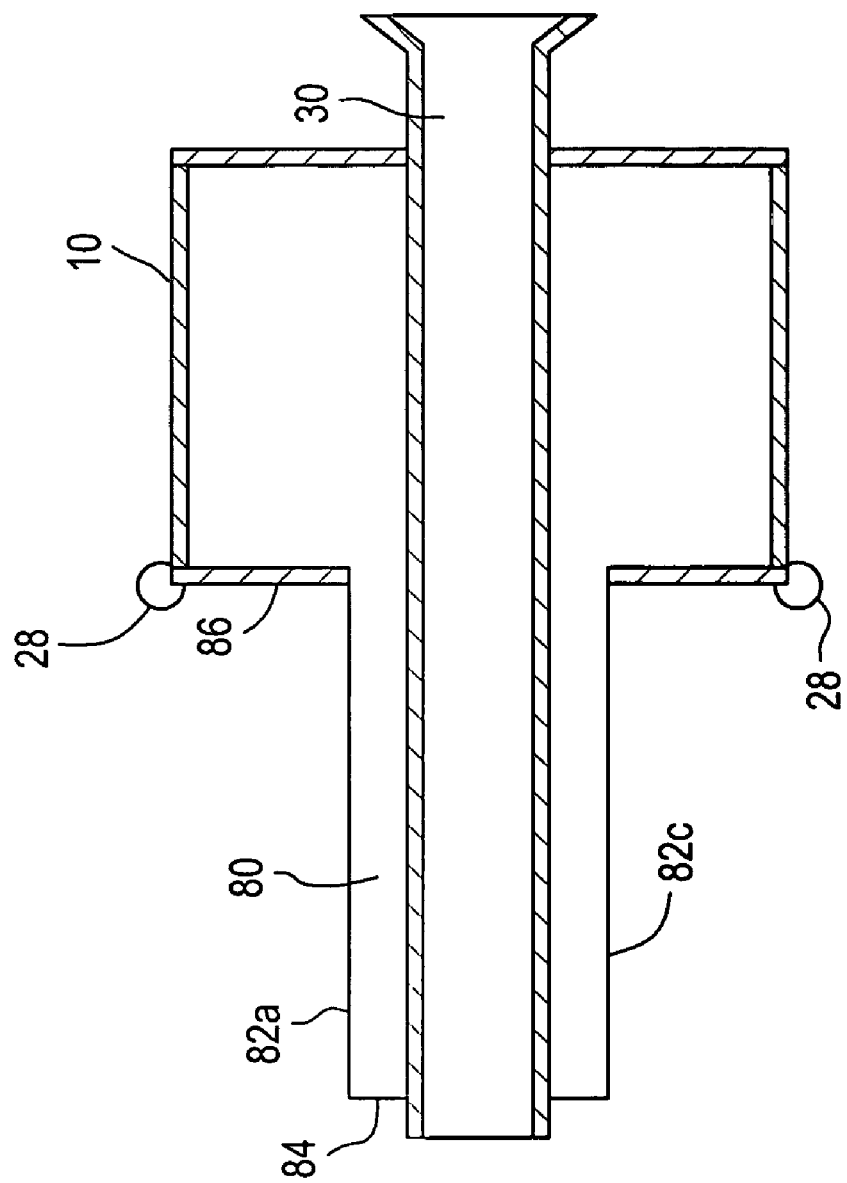
FIG. 7 is a cross-sectional view of an embodiment of the apparatus of the present invention, with the tube holder of FIG. 6 in use.

Alternatively, instead of netting tube 20, tube holder 80, as shown in FIG. 6, can be used in conjunction with removable tube 70. Tube holder 80 is preferably four rods 82a, 82b, 82c, and 82d, which span and connect downstream ring 84 and attachment disc 86. Attachment disc 86 has the same outside diameter as shir housing 10 and connects to shir housing 10 by fasteners 28 sold under the brand name QUICK LOCK®, in the same manner as transition plate 22 connected to shir housing 10 as described above. Attachment disc 86 defines annular aperture 88 through which filling horn 30 projects. FIG. 7 shows tube holder 80 as attached to shir housing 10. In this configuration, removable tube 70 slides over tube holder 80 and base plate 74 locks onto attachment disc 86.

Figure 8:
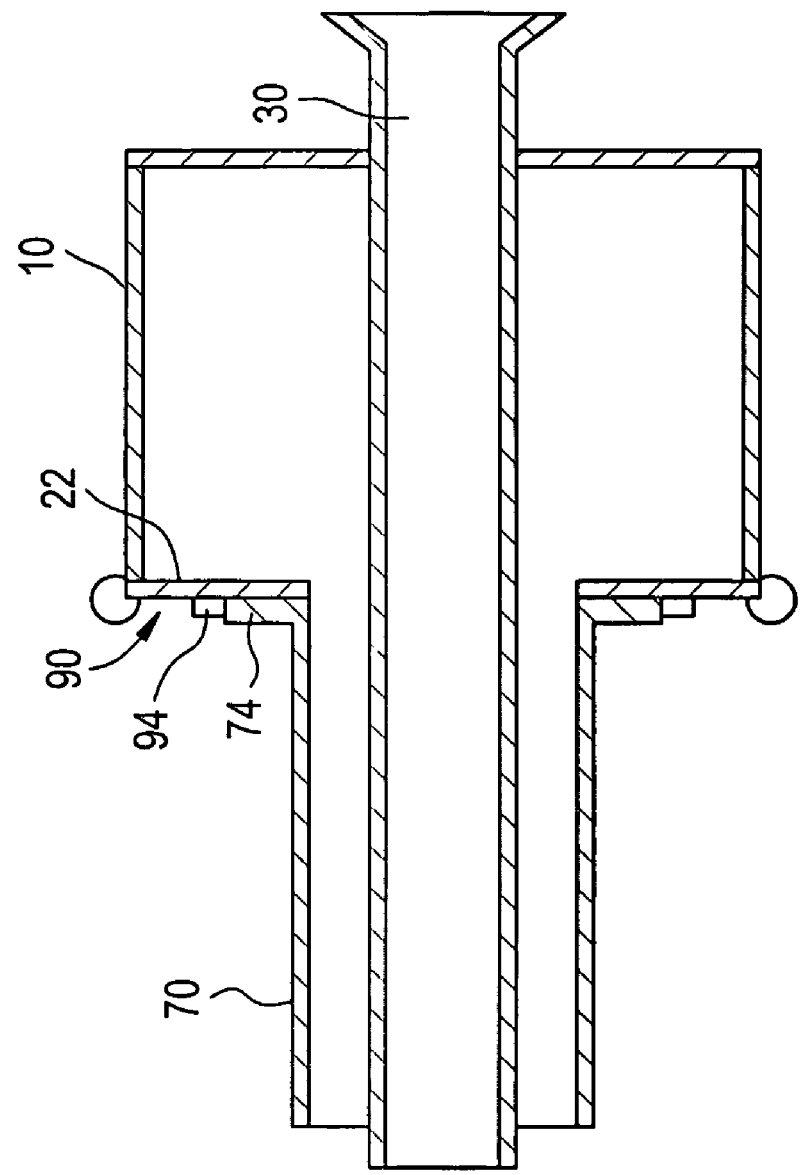
FIG. 8 is a cross-sectional view of an embodiment of the apparatus of the present invention with the removable tube of FIG. 4 attached directly thereon by means of a cover.

In another embodiment, cover 90 is a flat disc defining annular aperture 92. Cover 90 attaches to shir housing 10 by means of fasteners 28 sold under the brand name QUICK LOCK®, in the same manner as transition plate 22 connected to shir housing 10 as described above. In this embodiment, base plate 74 of removable tube 70 locks onto cover 90 with a bayonet-lock arrangement 94, similar to how tubular holder 70 locks onto transition plate 22 as described above. Thus, tubular holder 70 attached directly to cover 90, and therefore to shir housing 10, without any internal support, as shown in FIG. 8. In this embodiment, removable tube 70 must have sufficient structural strength to maintain a horizontal configuration.

In the use of apparatus 2, the filling horn 30 protrudes from the sausage-making machine and has a length of tubular edible collagen film 40 shirred onto it. The film 40 is protected by the shir housing 10, which surrounds the netting tube 20 near the upstream end 24 of the netting tube 20. In some embodiments, the netting tube 20 extends downstream from the shir housing 10 and holds the netting 50 in place. In another embodiment, netting 50 is held in place on removable tube 70, which either slides over netting tube 20, over tube holder 80, or locks directly onto shir housing 10 via cover 90. A conventional clipper 62 is located at the downstream end 34 of the filling horn 30.

The tubular film 40 is shirred onto the filling horn 30 and past the downstream end 34 of the filling horn 30. The netting 50 surrounds film 40 coaxially. Upon first use, the end of the netting 50 and the end of the film 40 are clipped by clipper 62. The clip applied here will become one end of the first sausage made by the apparatus 2. (Please note, however, that the first sausage is likely to contain quite a bit of air. It is recommended to bleed as much air out of the system as possible before applying the first clip.)

The sausage meat, having been made in the sausage-making machine, is extruded under pressure in a conventional manner into the bore of the filling horn 30. As the sausage meat progresses downstream through the filling horn 30, it pushes the tubular film 40 off the filling horn 30 and out the downstream end of the apparatus 2, and pushes the netting 50 off the netting horn 20 or removable tube 70. As the film 40 is pushed off the filling horn 30, it expands outward against the netting 50 from the pressure of the sausage meat. Since the netting 50 is of a smaller diameter than that of the film 40, the film 40 will bulge through the spaces in the netting 50, creating the dimpled appearance that is an object of the invention. A representative sausage 100 is shown in FIG. 12.

After a sufficient length of sausage has been extruded, the clipper 62 squeezes the netting 50 and film 40, applies two clips, and severs the sausage between the two clips in a conventional manner. The sausage is now ready for further processing, such as cooking or smoking. The next sausage is ready for filling as described above and the process continues as set forth above.

Figure 9:
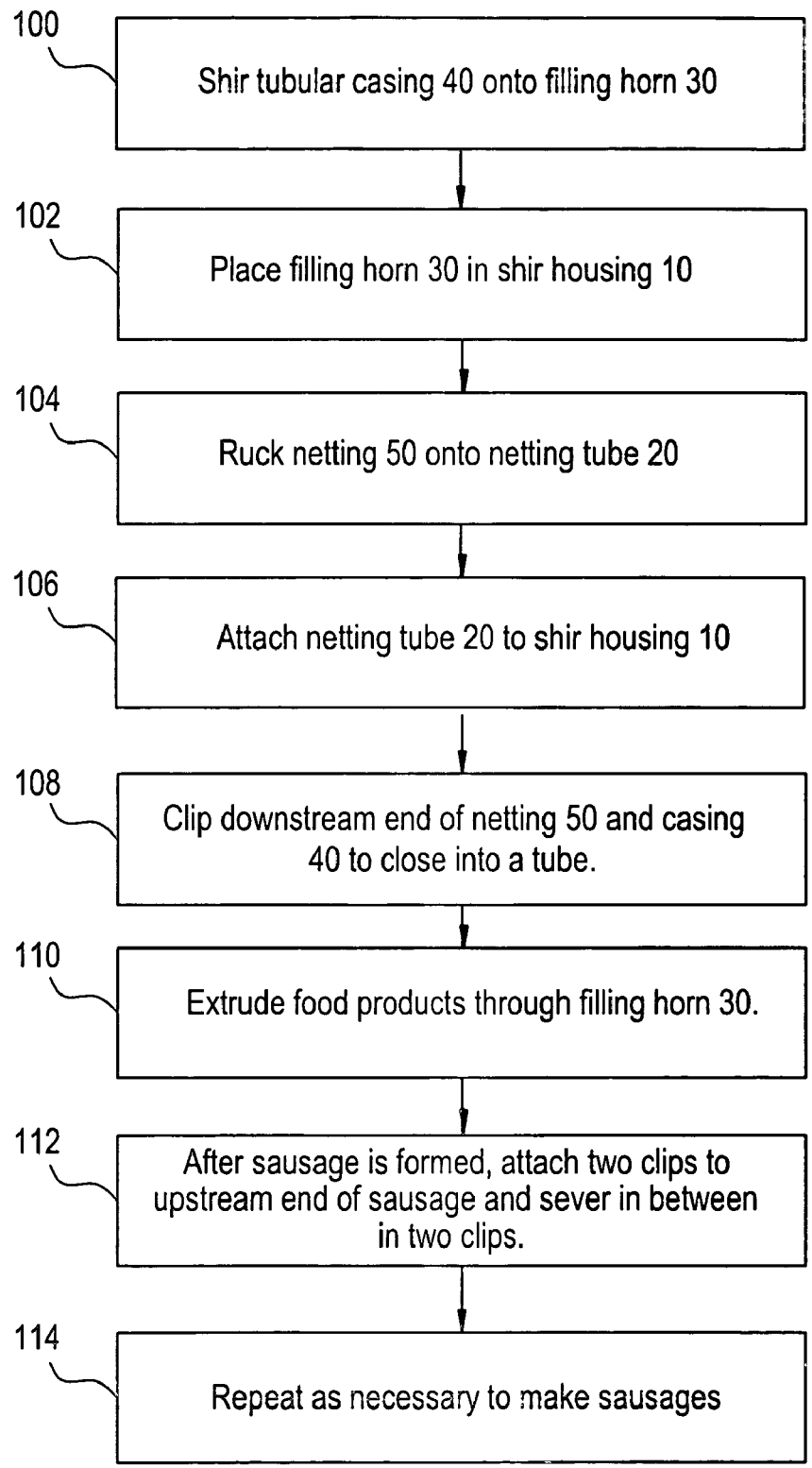
FIG. 9 is a flow diagram of an embodiment of the method of the present invention.

The steps of the method of one embodiment of the present invention are shown in box diagram form in FIG. 9. These steps are to shir the tubular casing 40 onto the filling horn 30 (step 100), place the filling horn 30 in the shir housing 10 (step 102), ruck netting 50 onto a netting tube 20 (step 104), attach netting tube 20 to shir housing 10 (step 106), clip the downstream end of netting 50 and film 40 to close an end of a tube (step 108), extrude food products through filling horn 30 (step 110), form sausages, attach two clips, and sever (step 112) and repeat the process (step 114).

Figure 10:
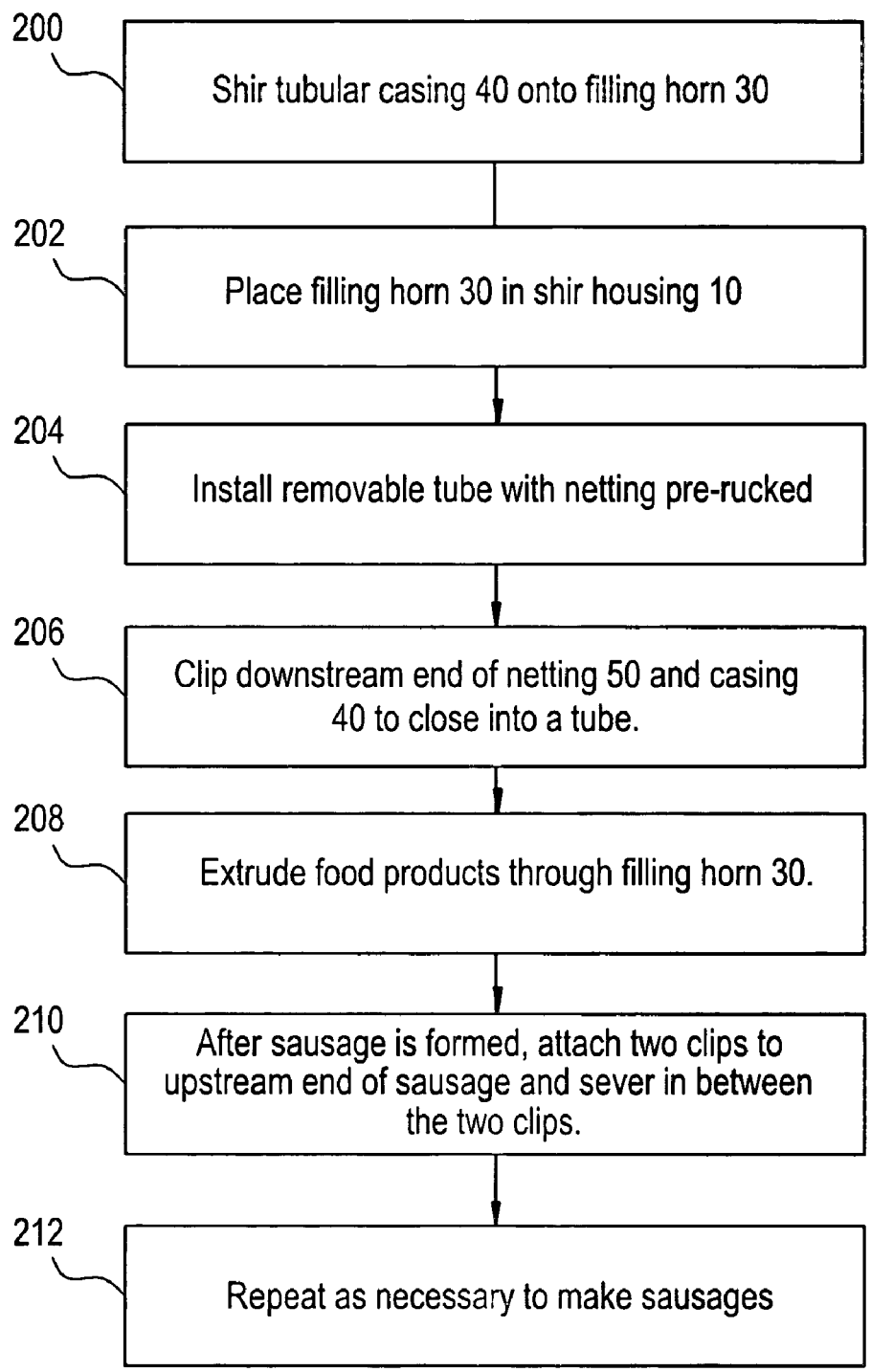
FIG. 10 is a flow diagram of another embodiment of the method of the present invention.

The steps of another embodiment are shown in box diagram form in FIG. 10. These steps are to shir the tubular casing 40 onto the filling horn 30 (step 200), place the filling horn 30 in the shir housing 10 (step 202), install removable tube (on which netting is already rucked) onto shir housing (step 204), clip the downstream end of netting 50 and film 40 to close an end of a tube (step 206), extrude food products through filling horn 30 (step 208), form sausages, attach two clips, and sever (step 210) and repeat the process (step 212).

In either embodiment as described, the sausage product is ready for further processing, such as cooking or smoking.

While preferred embodiments of the present invention are shown and described, it is envisioned that those skilled in the art may devise modifications of the present invention without departing from the spirit and scope of the appended claims.

I claim:

1. In combination, an apparatus to net a food product, a casing and netting, comprising:
    a casing having a filled dimension when filled with a food product;
    a netting having an outside dimension less than said filled dimension; and
    an apparatus including:
        a filling horn defining a bore for receiving extruded food products and having a cross-sectional dimension, said filling horn receiving said casing, said filled dimension of said casing being greater than said cross-sectional dimension of said filling horn,
        a shir housing mounted coaxially to said filling horn and having an outside dimension greater than said cross-sectional dimension of said filling horn, and
        a netting housing attached to said shir housing coaxially to said filling horn, said netting housing comprising a netting tube and a tube holder, said tube holder comprising an attachment disc defining an annular aperture, a downstream ring, and a plurality of rods connecting said attachment disc to said downstrean, ring, said attachment disc being mountable to said shir housing so that said filling horn protrudes through said annular aperture and through said downstream ring, said netting tube comprising a tubular section and a base plate, said tubular section having an inside diameter and an outside diameter, said outside diameter of said tubular section of said netting tube being less than said outside dimension of said netting, said netting tube being mountable over said tube holder and said base plate being mountable to said attachment disc, and said tubular section being configured for receiving said netting,
    whereby food products extruded from said filling horn into said casing expand said casing against said netting to create a dimpled appearance in the food product.

2. The combination of claim 1, wherein said apparatus further comprises a clipper.

3. The combination of claim 1, wherein said casing is edible.

4. The combination of claim 1, wherein said casing further comprises at least one of dye and flavoring.

5. The combination of claim 1, wherein said netting tube is plastic.

6. The combination of claim 1, wherein said netting tube is disposable.

7. The combination of claim 1, wherein said netting tube is recyclable.

* * * * *